US012783885B1

(12) United States Patent
Ghodsi et al.

(10) Patent No.: US 12,783,885 B1
(45) Date of Patent: Nov. 3, 2026

(54) FUNCTION CREATION FOR DATABASE EXECUTION OF DEEP LEARNING MODEL

(71) Applicant: Databricks, Inc., San Francisco, CA (US)

(72) Inventors: Ali Ghodsi, Berkeley, CA (US); Sue Ann Hong, Berkeley, CA (US); Timothee Hunter, Berkeley, CA (US); Shi Xin, San Francisco, CA (US)

(73) Assignee: Databricks, Inc., San Francisco, CA (US)

(*) Notice: Subject to any disclaimer, the term of this patent is extended or adjusted under 35 U.S.C. 154(b) by 124 days.

(21) Appl. No.: 18/588,508

(22) Filed: Feb. 27, 2024

Related U.S. Application Data

(63) Continuation of application No. 18/162,291, filed on Jan. 31, 2023, now Pat. No. 11,948,084, which is a continuation of application No. 15/610,062, filed on May 31, 2017, now Pat. No. 11,599,783.

(51) Int. Cl.

| | |
|---|---|
| ***G06N 3/08*** | (2023.01) |
| ***G06F 16/14*** | (2019.01) |
| ***G06F 16/22*** | (2019.01) |
| ***G06N 3/04*** | (2023.01) |
| ***G06N 3/063*** | (2023.01) |
| ***G06N 5/02*** | (2023.01) |
| ***G06N 5/022*** | (2023.01) |

(52) U.S. Cl.
CPC ................. *G06N 3/08* (2013.01); *G06N 3/04* (2013.01); *G06N 3/063* (2013.01); *G06N 5/022* (2013.01); *G06N 5/027* (2013.01); *G06F 16/14* (2019.01); *G06F 16/22* (2019.01)

(58) Field of Classification Search
CPC ........... G06N 3/08; G06N 3/04; G06N 3/063; G06N 5/022; G06N 5/027; G06F 16/14; G06F 16/22
See application file for complete search history.

(56) References Cited

U.S. PATENT DOCUMENTS

| | | | |
|---|---|---|---|
| 2013/0185729 | A1 | 7/2013 | Vasic et al. |
| 2015/0358383 | A1 | 12/2015 | Nathan et al. |
| 2016/0335122 | A1 | 11/2016 | Ding et al. |
| 2017/0061326 | A1 | 3/2017 | Talathi et al. |

(Continued)

OTHER PUBLICATIONS

Shirahata ("Hybrid Map Task Scheduling for GPU-Based Heterogeneous Clusters" Nov. 30, 2010) 2nd IEEE International Conference on Cloud Computing Technology and Science DOI 10.1109/CloudCom.2010.55 (Year: 2010).*

(Continued)

*Primary Examiner* — Usmaan Saeed
*Assistant Examiner* — Su-Ting Chuang
(74) *Attorney, Agent, or Firm* — Fenwick & West LLP

(57) ABSTRACT

A function creation method is disclosed. The method comprises defining one or more database function inputs, defining cluster processing information, defining a deep learning model, and defining one or more database function outputs. A database function is created based at least in part on the one or more database function inputs, the cluster set-up information, the deep learning model, and the one or more database function outputs. In some embodiments, the database function enables a non-technical user to utilize deep learning models.

20 Claims, 12 Drawing Sheets

(56) References Cited

U.S. PATENT DOCUMENTS

2018/0136912 A1 5/2018 Venkataramani et al.

OTHER PUBLICATIONS

Ma ("Energy conservation for GPU-CPU architectures with dynamic workload division and frequency scaling" May 26, 2016) Sustainable Computing: Informatics and Systems 12 (2016) 21-33 (Year: 2016).*
Alipourfard ("CherryPick: Adaptively Unearthing the Best Cloud Configurations for Big Data Analytics" Mar. 27, 2017) 14th USENIX Symposium on Networked Systems Design and Implementation (NSDI '17).*
Dalibard ("BOAT: Building Auto-Tuners with Structured Bayesian Optimization" Apr. 3, 2017) WWW '17: Proceedings of the 26th International Conference on World Wide Web (Apr. 2017) (Year: 2017).*
Emeras ("Amazon Elastic Compute Cloud (EC2) vs. in-House HPC Platform: a Cost Analysis" Nov. 14, 2016) 2016 IEEE 9th International Conference on Cloud Computing (Year: 2016).*
Barga ("Predictive analytics with Microsoft Azure machine learning" 2015) Copyright © 2015 by Roger Barga, Valentine Fontama, and Wee Hyong Tok (Year: 2015).*

* cited by examiner

Pipelining Flow

FUNCTION CREATION FOR DATABASE EXECUTION OF DEEP LEARNING MODEL

CROSS REFERENCE TO RELATED APPLICATIONS

This application is a continuation of prior, co-pending U.S. application Ser. No. 18/162,291, filed on Jan. 31, 2023, which is a continuation of U.S. patent application Ser. No. 15/610,062 (now U.S. Pat. No. 11,599,783), filed on May 31, 2017, all of which are incorporated herein by reference in their entirety for all purposes.

BACKGROUND

Machine learning involves the construction and use of algorithms capable of data-driven predictions or decisions. Deep learning is a powerful form of machine learning that utilizes neural networks. A machine learning or deep learning algorithm is constructed through building a model from a sample data set. Training a model is typically a computationally expensive and highly technical process. In addition, processing data through a trained model to create a prediction is difficult for most users. The difficulty for technical users and inaccessibility to non-technical users presents a barrier to utilizing machine and deep learning methods in computing.

BRIEF DESCRIPTION OF THE DRAWINGS

Various embodiments of the invention are disclosed in the following detailed description and the accompanying drawings.

DETAILED DESCRIPTION

Figure 1:
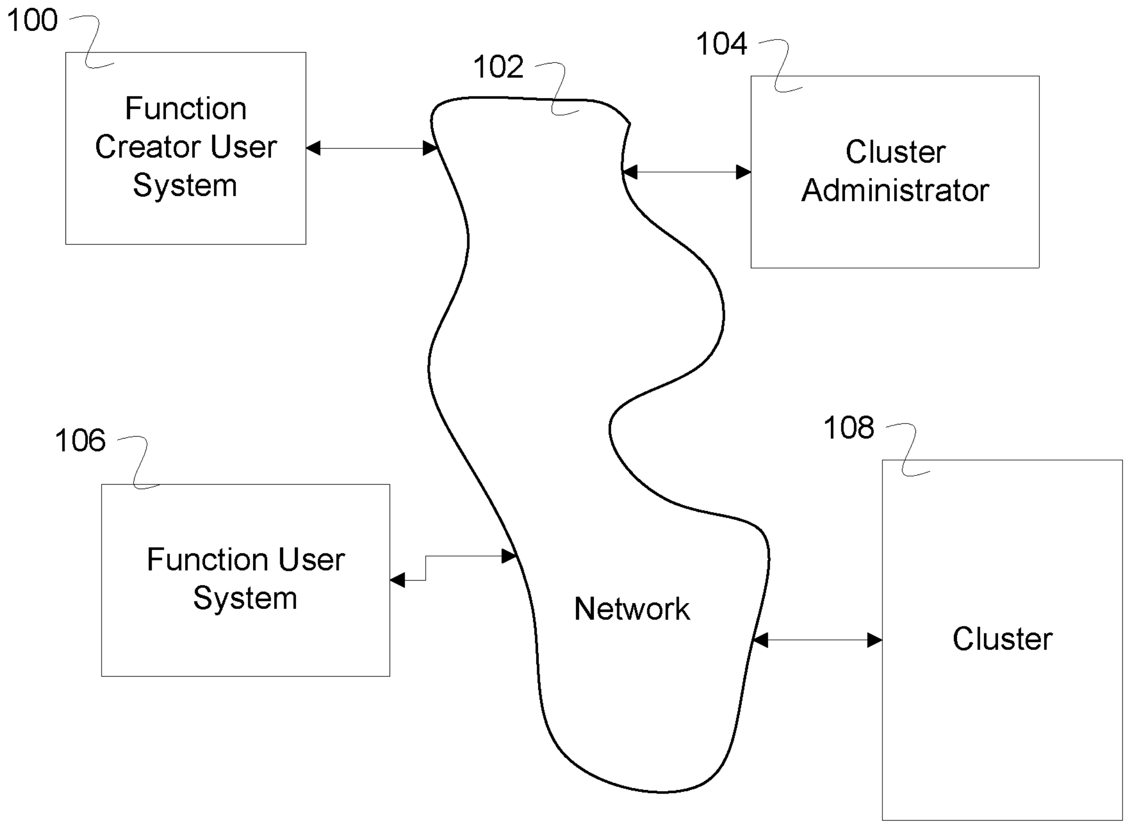
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term ‘processor’ refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for function creation is disclosed. The system comprises an interface and a processor. The interface is configured to receive an indication to create a database function. The processor is configured to define one or more database function inputs, define cluster processing information, define a deep learning model, define one or more database function outputs, and create a database function. The database function is created based at least in part on the one or more database function inputs, the cluster set-up information, the deep learning model, and the one or more database function outputs. In some embodiments, the database function is further stored or registered.

A system for function creation is disclosed. The system comprises an interface and a processor. The interface is configured to receive an indication to create a database function. The processor is configured to define one or more database function inputs, define cluster processing information, define a deep learning model, define one or more database function outputs, define a model add-on, define a training data set for the model add-on and the dep learning model, and create a database function. The database function is created based at least in part on the one or more database function inputs, the cluster set-up information, the deep learning model, the one or more database function outputs, the model add-on, and the training data set. In some embodiments, the database function is further stored or registered.

In some embodiments, the system for creating a function is used to package deep learning capabilities in a database function that can be simply understood and executed by non-technical users. This improves the functionality of a database system. In some embodiments, the deep learning database function enables use of pre-trained deep learning models, wherein a user interacts with the models as a black box (e.g. provide inputs and receive outputs). In some embodiments, created functions are stored in a function storage accessible to users. In some embodiments, a deep learning model and its training are utilized in a closely related fashion by adding on a module after the deep learning model and training the add-on in conjunction the deep learning model. In some embodiments, the system is executed with general machine learning models in addition to deep learning models.

FIG. 1 is a block diagram illustrating an embodiment of a network system. In the example shown, function creator user system 100, cluster administrator 104, function user system 106, and cluster 108 communicate over network 102. Function creator user system 100 comprises a system that provides input to a function creator in order to create a desired function. For example, a user of function creator user system 100 may desire to create an image detection database function by specifying an appropriate deep learning model object to be used.

Function user system 106 comprises a system that provides an indication to execute existing functions. For example, a user of function user system 106 may input an image to a car detection function to determine whether a car is present. In some embodiments, a user of function user system 106 chooses from existing functions stored in a function storage built by or added to by a user of function creator user system 100. In some embodiments, a user of function user system 106 comprises a business analyst accustomed to using database functions. A user of function user system 106 may be non-technical in regards to deep learning and machine learning techniques.

Cluster administrator 104 comprises a system that includes a database executor for executing database functions as well as a function creator for creating database functions. In some embodiments, cluster administrator 104 comprises multiple elements that interact with function creator user system 100, function user system 106, and cluster 108. In some embodiments, the cluster administrator receives inputs from various users, determines how to run corresponding calculations and processes, and executes the calculations and processes on cluster 108. Cluster 108 comprises multiple computers that work together. For example, cluster 108 may comprise a plurality of units each with a central processing unit (CPU), graphics processing unit (GPU), field programmable gate array (FPGA), any other computing resource, or any combination of computing resources.

Network 102 comprises one or more of a wired network, a wireless network, the internet, a local area network, a wide area network, a private network, or any other appropriate network.

Figure 2:
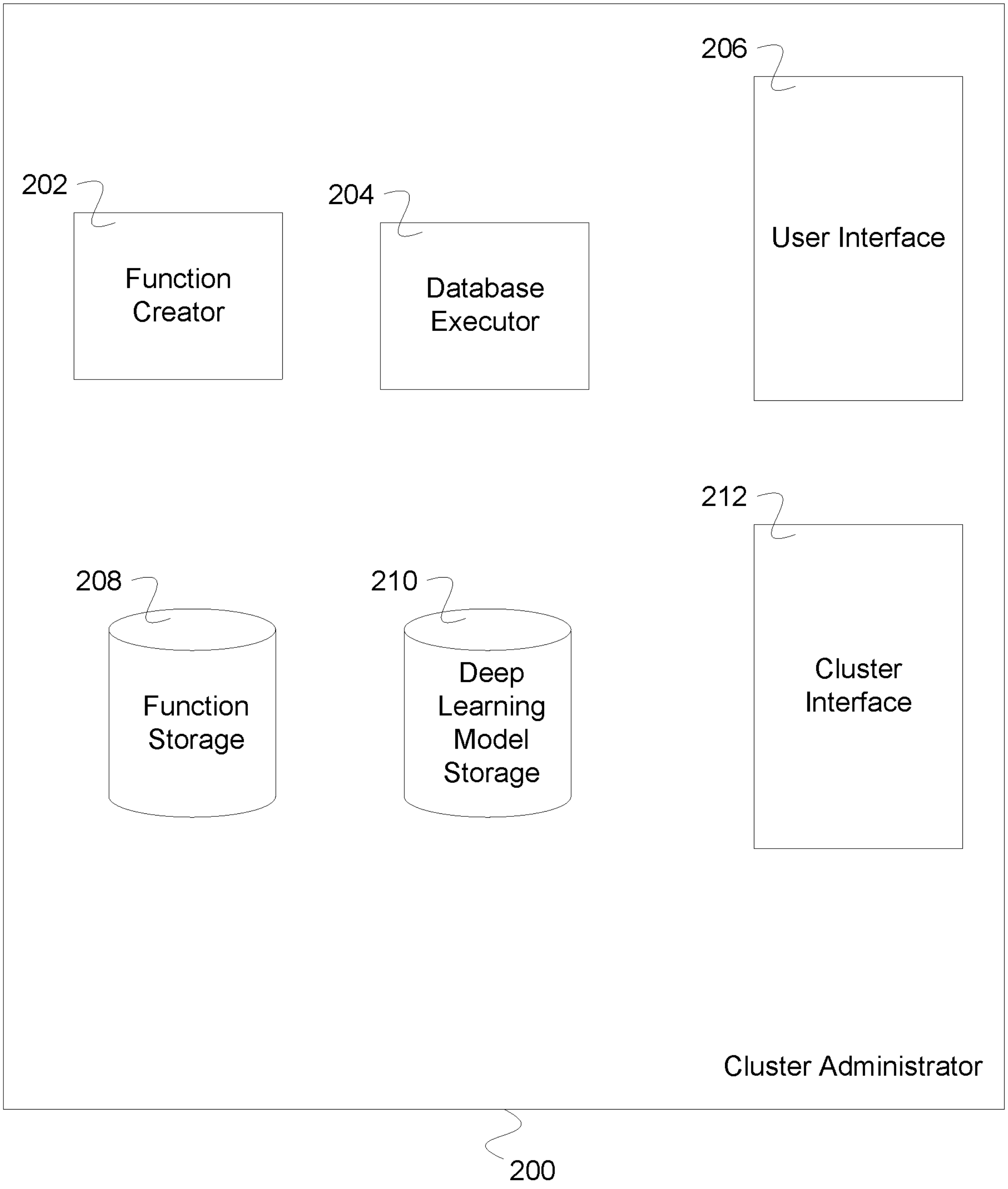
FIG. 2 is a block diagram illustrating an embodiment of a cluster administrator.

FIG. 2 is a block diagram illustrating an embodiment of a cluster administrator. In some embodiments, cluster administrator 200 of FIG. 2 is used to implement cluster administrator 204 of FIG. 1. In the example shown, cluster administrator 200 comprises function creator 202, database executor 204, user interface 206, function storage 208, deep learning model storage 210, and cluster interface 212. Function creator 202 receives function creation inputs and creates a function based on received specifications. The function creator creates a function based on deep learning models stored in deep learning model storage 210. Deep learning database functions are stored in function storage 208, while deep learning models are stored in deep learning model storage 210. A function creator user systems or function user systems may interact with cluster administrator components via user interface 206. Cluster requests or outputs may be sent and received, respectively, via cluster interface 212. For example, a function user system may provide function inputs via user interface 206. The function may be executed on the cluster, with data transmission occurring over cluster interface 212. Function outputs may then be provided to the function user. In some embodiments, the inputs from a function user creator system are used to define a database function (e.g., an indication of input types, an indication of a model, an indication of output types, an indication of cluster resources (if available), an indication of an add-on model (if appropriate), an indication of a training set for the add-on model (if appropriate), etc.). The database function is stored in function storage 208 and then transferred to a cluster for execution.

Figure 3:
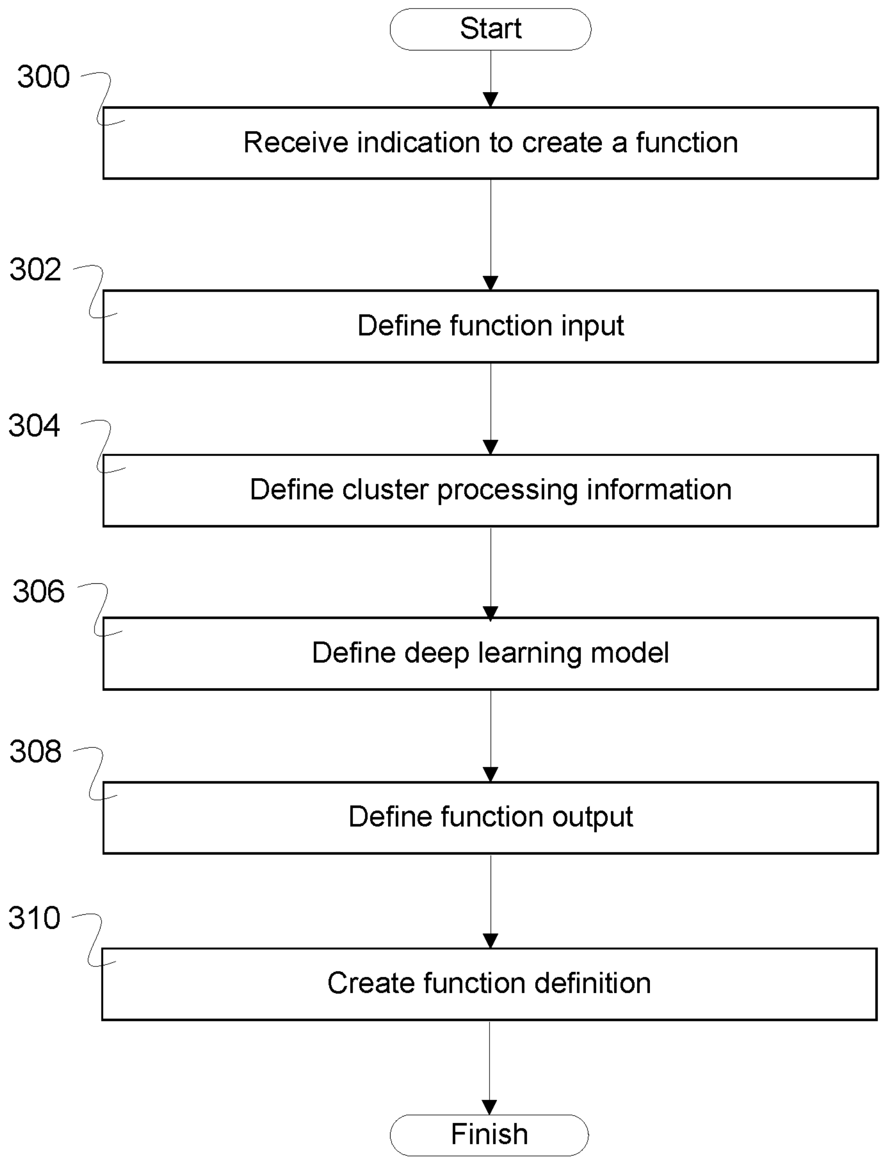
FIG. 3 is a flow diagram illustrating an embodiment of a database function creator user process.

FIG. 3 is a flow diagram illustrating an embodiment of a database function creator process. In some embodiments, the process of FIG. 3 is executed using function creator 202 of FIG. 2. In the example shown, the function creator user may specify inputs to a function creator, which automatically creates the function. In 300, an indication is received to create a function. In 302, function input is defined. For example, acceptable function input types are defined. In some embodiments, the database interaction uses a query language used to access databases, such as structured query language (SQL). Input types may comprise query language input types (e.g., SQL data types). The ultimate created database function is a SQL user-defined function (UDF).

In 304, cluster processing information is defined. In various embodiments, the cluster processing information comprises author specified settings, definition of a static analysis test, definition of a pretest to be run at execution of the function, or any other appropriate processing information. For example, a function creator user may expect the function to be computationally intensive and specify that the function run on a GPU or that the function run on a number of processors, with an amount of memory, with an amount of disk storage, etc. The cluster processing information may comprise an indication to determine resource allocation or batch size through static analysis (e.g. without executing the function—for example, an analysis of the commands in the function, a historical analysis of execution times, a statistical model of historical execution times to determine various execution parameters, etc.). In some embodiments, the cluster processing information comprises a performance threshold and an indication to adjust the resource allocation or the batch size of the database function in the event the database function performance is below the performance threshold. Performance may be monitored during a model computation step of executing the function.

In 306, a deep learning model is defined. In some embodiments, a deep learning model is defined by specifying a deep learning model framework and deep learning model file location. In various embodiments, a model is saved as a set of files stored locally, on the cluster, as a uniform resource locator (URL), or any other appropriate location. The deep learning model framework may comprise a model file format and execution engine type. For example, the model may be defined in TensorFlow, mxnet, Keras, Therano, Caffe, Torch, or other appropriate frameworks. The model framework defines how computation is done, wherein different frameworks are executed differently. In some embodiments, the deep learning model is defined by specifying a deep learning model object. In some embodiments, the framework is inferred based on the object. In some embodiments, input and output nodes of the deep learning model may be determined from the stored model files and connected to the function inputs and function outputs. In some embodiments, preprocessing is required to transform database query language inputs to the function to an appropriate form for the model inputs. In some embodiments, postprocessing is required to transform outputs of the model to an appropriate form for the function outputs. In 308, function output is defined. For example, function output types such as desired SQL output types are defined. In various embodiments, a defined output type comprises one of the following: a map, vector, an image, or any other appropriate output type.

In 310, the database function definition is created. For example, using the definitions the database function is defined and the definition is stored. The stored database function is used for the execution of the function—for example, the stored function is transferred to a cluster to execute and process input data files. In some embodiments, the registration of the database function makes the function available to be run as a callable function from a database interface.

In some embodiments, the function creator may comprises various application program interfaces (APIs) which allow the creation process to be simplified or detailed. At a high level, a function creator user may merely provide a deep learning model as an input. Other parameters (e.g. input type or output type) may be inferred based on the model. The function creator may be used by a technical user who desires to specify details about the function or a non-technical user who simply selects a deep learning model object.

Figure 4:
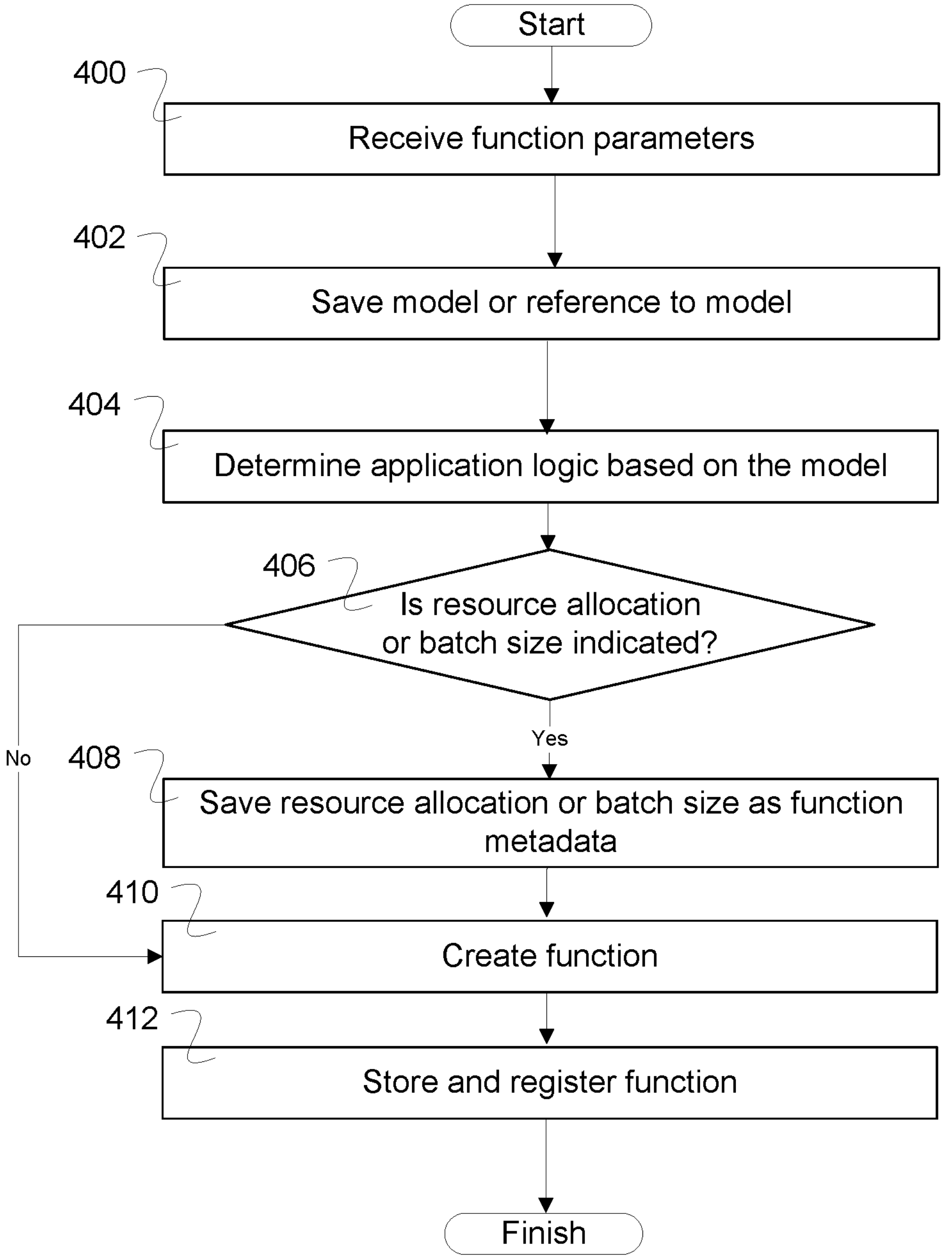
FIG. 4 is a flow diagram illustrating an embodiment of a database function creator process.

FIG. 4 is a flow diagram illustrating an embodiment of a database function creator process. In some embodiments, the process of FIG. 4 is used to implement 310 of FIG. 3. In the example shown, in 400, function parameters are received. For example, a function input type, cluster processing information, a deep learning model, and a function output type are received. In 402, a model or a reference to the model is saved. In some embodiments, the model is serialized as part of the function. In some embodiments, the model is stored in deep learning model storage, and a reference to the model is saved in the function storage. In 404, application logic is determined based on the model. In some embodiments, an appropriate method is called or appropriate logic is executed that applies the model based on the model framework. For example, keras.run( ) may be called in the event the model framework specified is Keras. In 406, it is determined whether resource allocation or batch size is indicated. Cluster settings such as resource allocation or batch size may be specified upon creation of the function in the event a function creator user directly specifies the settings. In various embodiments, results of a static analysis is associated (e.g., stored as metadata) with the function at the time of function creation to assist in determination of resource allocation, batch size, cluster parameters, or any other appropriate settings. In the event a static analysis is defined, the analysis may be performed at this time to determine appropriate cluster settings. In the event resource allocation or batch size is not indicated, in 410 the function is created. In the event resource allocation or batch size is indicated, the resource allocation or batch size is saved as function metadata in 408 before function creation. In some embodiments, resource allocation information refers to sizing of available resources for the process, such as number of central processing units (CPUs), amount of memory, etc. Resource allocation information may comprise an indication to perform certain steps of the function on specific computing resources of the cluster whereas other steps are performed on different computing resources. For example, executing the deep learning model may be performed on a higher performing GPU whereas certain less computationally intensive processes such as data type conversion is performed on a CPU. In some embodiments, execution of the deep learning model is performed on a GPU in the event that the task runs more efficiently in parallel. Following function creation, in 412 the function is stored and registered. For example, the function is registered as an available function on an application such as SparkContext, allowing it to be accessed by function users. The function may be stored in a database of functions or other function storage location. The function is stored as a definition or as an object as is convenient for later execution when called upon to be executed by cluster resources.

Figure 5:
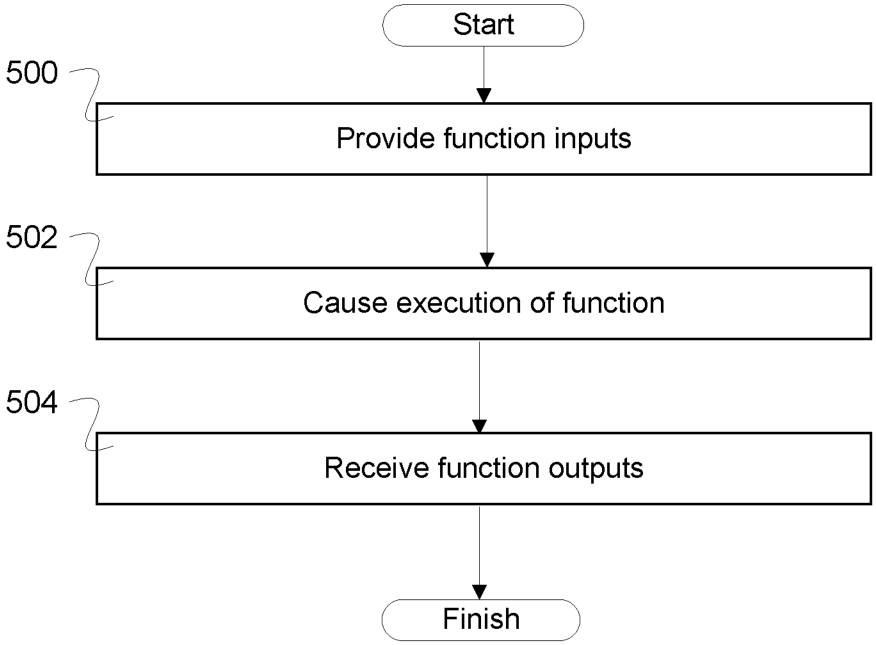
FIG. 5 is a flow diagram illustrating an embodiment of a database function user process.

FIG. 5 is a flow diagram illustrating an embodiment of a database function execution process. In some embodiments, the process of FIG. 5 is executed using 204 of FIG. 2. In the example shown, in 500, function inputs are provided. For example, the database function user system provides data (e.g., an image) to a function designed to determine whether an object is recognized in the data (e.g., a dog is pictured in the image or not). In 502, execution of the function is caused. For example, the database function is caused to be executed on a cluster. For example, the user may type "select img_classify (image) from images" in SQL that indicates to execute the database function img_classify with input data image. in 504, function outputs are received. For example, the output of the cluster executed function is converted and output to the user. For example, the function output may be a string that states a dog is present.

In various embodiments, the function takes image, text, audio, or any appropriate data. In various embodiments, the function outputs various output types, such as image or text. For example, the function may comprise a filter that outputs the inputted image with some transformation.

Figure 6:
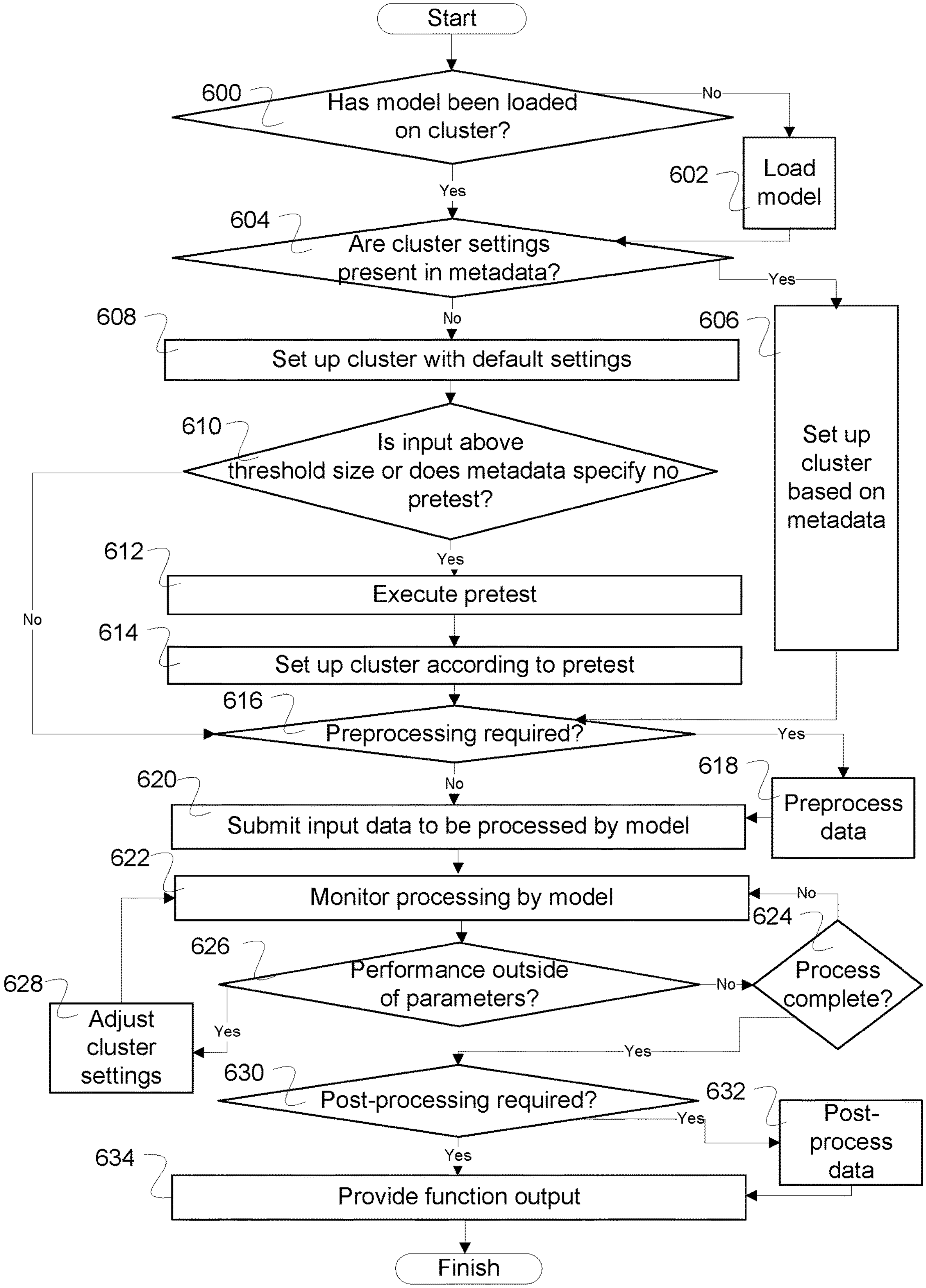
FIG. 6 is a flow diagram illustrating an embodiment of a database function execution process.

FIG. 6 is a flow diagram illustrating an embodiment of a database function execution process. In some embodiments, the process of FIG. 6 is used to execute 502 of FIG. 5. In the example shown, in 600, it is determined whether the model has been loaded on the cluster. In the event the model has not been loaded on the cluster, in 602 the model is loaded. In some embodiments, the model is loaded by transferring the serialized stored model to the cluster. In some embodiments, the model is loaded by transferring a pointer to the stored version of the model (e.g., an object or other stored form, etc.). In some embodiments, a deep learning model is only loaded once and stored on the cluster.

In 604, it is determined whether cluster settings are present in metadata. In the event cluster settings are present in metadata (e.g., function metadata), in 606 the cluster is set up based on the metadata. For example, the function metadata may indicate a batch size and the cluster may be set up to process function inputs in batches of the indicated size. As another example, the function metadata may indicate a number of processors, a memory size, a storage size, etc. In the event cluster settings are not present in metadata, in 608 the cluster is set up with default settings. In 610, it is determined whether the input is above a threshold size or whether certain metadata specifies that no pretest should be run. In the event input data is small and below the threshold size or metadata specifies no pretest, the default settings are kept. In the event input data is larger than the threshold size or metadata specifies no pretest, in 612 a pretest is executed. For example, the pretest may be designed to determine optimal cluster settings (e.g., resource allocation and batch size) based on a subset of the function input data and the cluster. In some embodiments, the type of pretest or pretest parameters may be stored in function metadata (e.g., defined by a function creator user or inferred at time of creation). In some embodiments, a standard pretest is used for all functions or is determined based on the deep learning model of the function. In 614, the cluster is set up according to the pretest. For example, a pretest determines that in order to achieve a performance metric (e.g., execution within a time), the cluster requires certain resources (e.g., number of CPUs, amount of memory, amount of disk space, etc.). Following cluster set-up (e.g., in 606 or in 614) or following the determination that the input is not above a threshold size, in 616 it is determined whether preprocessing is required.

In the event preprocessing is required, in 618 data is preprocessed. For example, database function inputs are preprocessed for submission to the deep learning model. In some embodiments, function inputs are converted from a function input data type to a deep learning model input data type. The deep learning model may have a rigid input schema and the preprocessing may involve data transformation. In various embodiments, input data are resized (e.g., image data array is expanded or compressed), data values are normalized (e.g., image data is normalized, color corrected, converted to black and white, etc.), strings are reformatted, or any appropriate preprocessing is performed. The deep learning model may have a flexible input and output schema so that preproessing is done as part of model computations. In the event preprocessing is not required or preprocessing has been completed, at 620 input data is submitted to be processed by the model. Appropriate model commands are run based on the model framework to execute the model on the cluster.

In 622, processing by the model is monitored. In 626, it is determined whether performance is outside of parameters. For example, performance parameters may be saved in function metadata. In various embodiments, performance parameters are standardized across all functions or are be based on the deep learning model. In the event performance is outside of parameters (e.g., deep learning computations are slower than acceptable), in 628 cluster settings are adjusted. For example, the processes are moved to run on a more powerful piece of hardware in the cluster or pipelining is instated. Following adjustment of cluster settings, the process returns to 622 and processing is monitored. In the event performance is not outside of parameters, in 624 it is determined whether the process is complete. The process is complete in the event model computations are complete and model outputs are available. In the event the process is not complete, processing monitored is continued at 622.

In the event the process is complete, at 630 it is determined whether post-processing is required. An output of the deep learning model may be post-processed. Model output types may be required to be type-mapped to function output types. Various transformations or formatting of images, strings, or other data may be performed. In some embodiments, preprocessing or post-processing is defined at function creation (e.g. by a function creator user or inferred based on model or input types). In some embodiments, a type mapping for a database function input type to a deep learning model input type or a deep learning model output type to a database function output type is defined at function creation. At 634, function output is provided. For example, the function output is provided to the cluster administrator and eventually provided to a function user system so that the output can be provided to a user (e.g., displayed).

Figure 7:
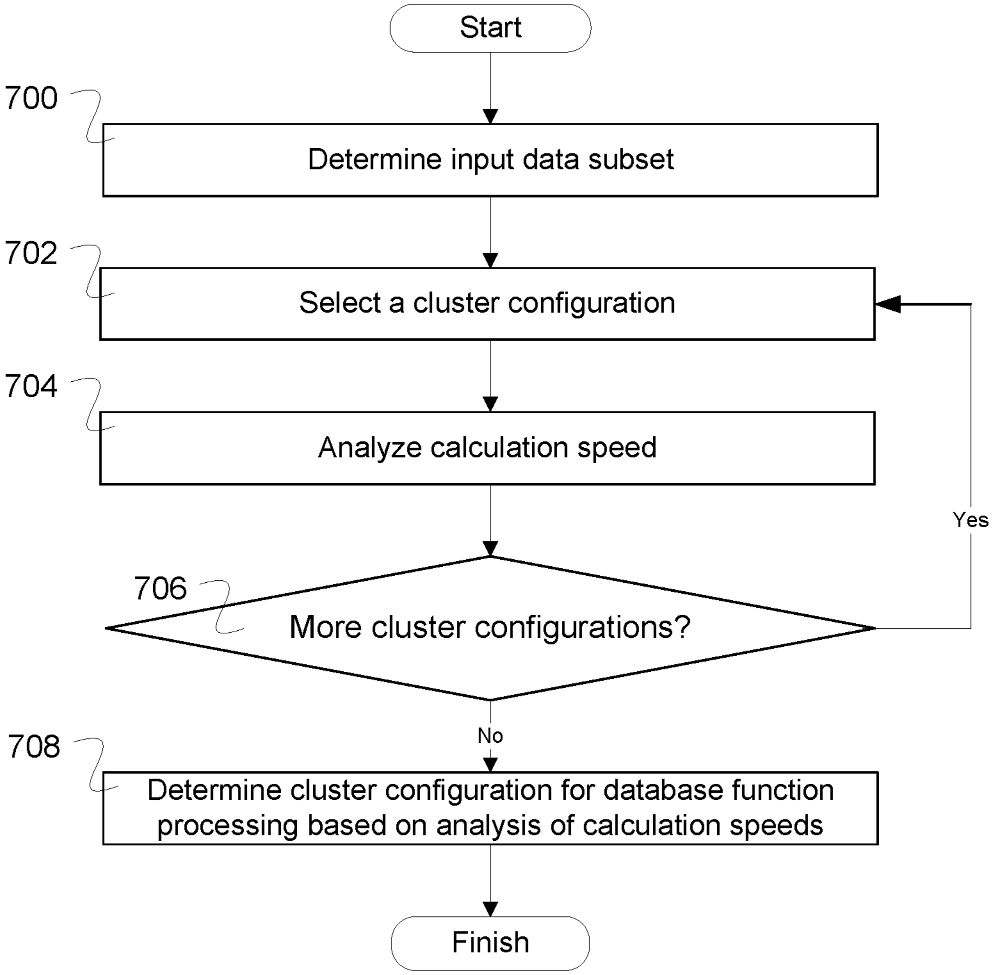
FIG. 7 is a flow diagram illustrating an embodiment of a pretest process.

FIG. 7 is a flow diagram illustrating an embodiment of a pretest process. In some embodiments, the process of FIG. 7 is used to implement 612 of FIG. 6. In the example shown, in 700 an input data subset is determined. For example, a row or N rows or a N×M array of data from an input data set is selected. In 702 a cluster configuration is selected. For example, a hardware configuration and batch size are selected. In various embodiments, a configuration is selected from a set of different hardware configurations and batch sizes. The cluster may comprise various hardware components, such as GPUs, CPUS, or FPGAs. The pretest may determine which resource/number of resources the function is optimally run on. For example, the test may determine that the function is executed equally quickly on a GPU and a CPU. In some embodiments, testing may determine pipelining of resource is optimal. The specifics of the pipelining, such as which steps of the function should be run on which resources, may be determined. In 704, calculation speed is analyzed. For example, the input data subset is processed using a cluster configured with the selected cluster configuration and the calculation speed is analyzed for comparison with other cluster configurations. For example, the function is executed (e.g. preprocessing, model computations, and post-processing) on the subset of data for the selected cluster configuration. In 706, it is determined whether there are more cluster configurations. In the event that there are more configurations, control passes to 702. In the event that there are not more configurations, then in 708 the cluster configuration for database function processing is determined based on an analysis of the calculation speeds. For example, a configuration is determined as the minimum or most cost effective (e.g., the cost of certain resources at certain times) resource configuration that meets a performance time criterion.

In some embodiments, calculation speeds are determined in parallel instead of serially and used to determine cluster configuration.

Figure 8:
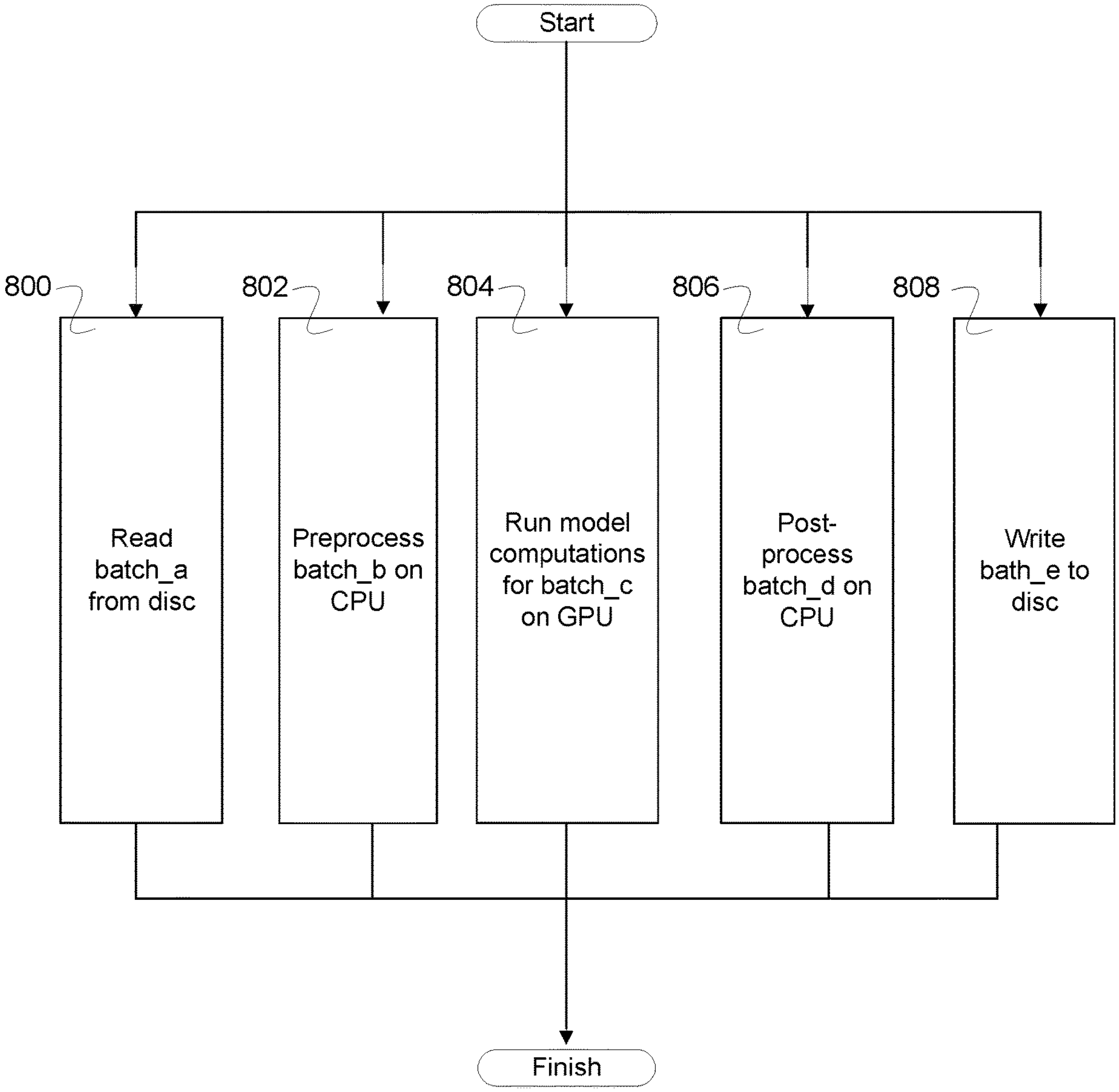
FIG. 8 is a flow diagram illustrating an embodiment of a pipelining process.

FIG. 8 is a flow diagram illustrating an embodiment of a pipelining process. In some embodiments, the process of FIG. 8 implements model processing. In some embodiments, the process of FIG. 8 is used to implement 502 of FIG. 5. In the example shown, a database function execution may be pipelined in order to efficiently use cluster resources. In some embodiments, pipelining of resources for simultaneously executing the database function on batches of database function inputs is defined at function creation. In some embodiments, pipelining is determined during pretesting. Pipelining uses different hardware to execute different stages of the function processing in order to efficiently process data. In 800, batch_a is read from disk. In 802, batch_b is preprocessed on a CPU. In 804, model computations are run for batch_c on a GPU. In 806, post-processing is performed on batch_d on a CPU. In 808, batch_e is written to disk. All processes as shown are performed simultaneously. The batches may be subsequent batches of data, wherein batch_e is the first batch of input data, batch_d is the second batch of input data, and so on. Multiple hardware resources of the cluster are used simultaneously. In some embodiments, hardware choice is optimized based on the task. For example, model computations may be computationally expensive and as such as run on a powerful GPU while writing to disk is performed via a CPU. In some embodiments, the entire function input data set is processed more quickly than a standard serial approach with one processor through use of pipelining.

Figure 9:
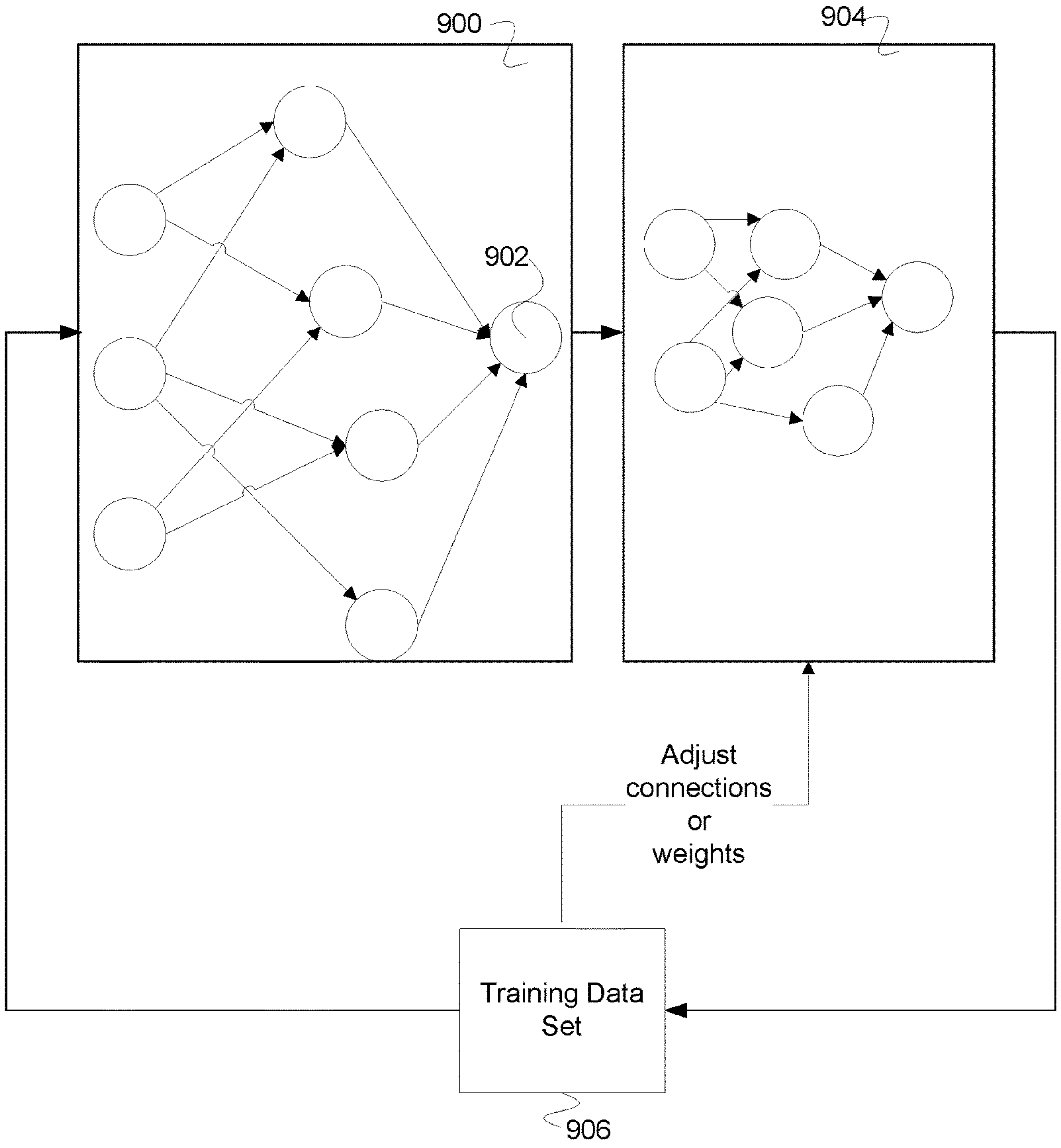
FIG. 9 is a diagram illustrating an embodiment of a transfer learning application.

FIG. 9 is a diagram illustrating an embodiment of a transfer learning application. In some embodiments, the previously disclosed method, performed with several additions, transfers a deep learning model to a closely associated problem by adding another model on to a deep learning model and training the add-on+deep learning model. Oftentimes, a deep learning or machine learning model does not exist for a desired task, but model for a related or similar task does exist. Training a completely new model may be computationally intensive, require technical expertise, take large amounts of data, or take long periods of time (e.g., days, weeks, months, years, etc.). Transfer learning allows a model trained for a first task to be modified and trained for a second related task, avoiding training a new model from scratch. In some instances, a subset of an existing deep learning model (e.g., the first 10 layers of the model) are connected to an add-on model and the add-on model is trained with training input fed into the combined model, allowing the combined model to be applied to a new problem.

A deep learning algorithm may be modeled as a neural network (e.g., model 900). In the example shown, the neural network comprising multiple layers converges at output node 902. Output node 902 outputs a prediction or decision related to a first task. Model add-on 904 may be created based on a second related task. For example, the first task involves identifying a car is present whereas a second task involves identifying a station wagon. The original model and model add-on may be joined by making one or more input nodes of the add-on an output of one or more nodes of the original model. In some embodiments, model add-on 904 comprises a neural network. In the example shown, a smaller neural network (e.g., model add-on 904) is adjoined to the original neural network (e.g., model 900). Model add-on 904 neural network comprises weights or relationships used to produce a desired prediction or decision for the model add-on 904 output that accomplishes the second task when the model add-on and original deep learning model (model 900) are adjoined.

In various embodiments, model add-on 904 is not a neural network (deep learning model) but instead is another non-deep/non-neural network machine learning model, or any other appropriate model.

In some embodiments, model add-on 904, when connected to the deep learning, is trained using training data to create a combined deep learning model. The combined deep learning model is trained on the second task (e.g. identifying a station wagon) using a training data set. In the example shown, the combined deep learning model is provide training inputs from training data set 906. As training happens, connections or weights within model add-on 904 are changed correspondingly to achieve the correct training outputs (as provided in training data set 906).

In some embodiments, the combined deep learning model is used to create a new database function. The new database function may be saved in function storage under a new function name. A function based on an original deep learning model that spawns several subsequent deep learning models via transfer learning may be saved with a label parameter. Different labels pertain to different branches of the original model. For example, a car classification function with no label may determine whether a car is present in an input image. The same car classification function with label "convertible" may be a function based upon the original car classification function's model, but trained on the specific task of identifying a convertible. Other labels may exist, corresponding to other car types.

Figure 10:
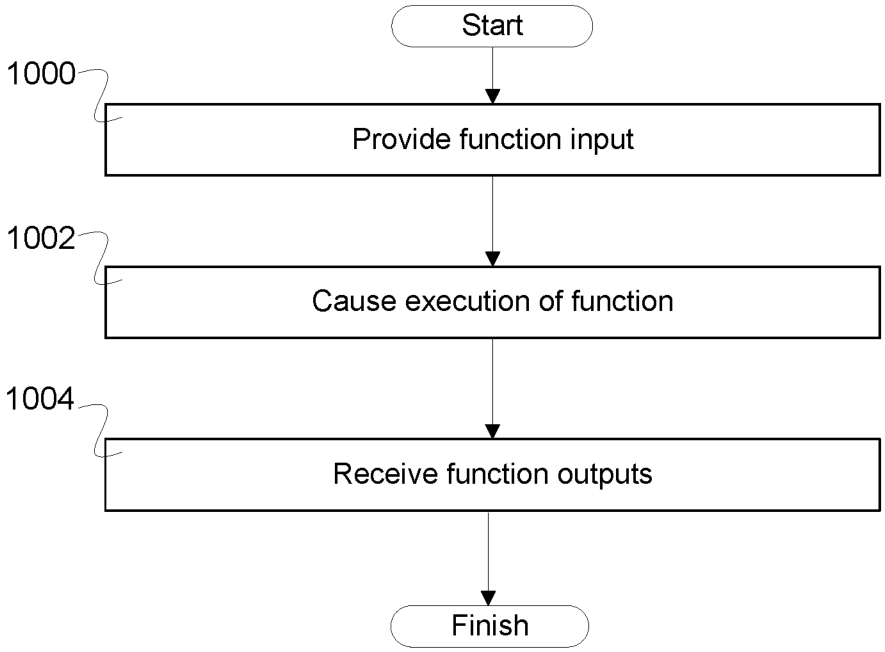
FIG. 10 is a flow diagram illustrating an embodiment of a transfer learning database function user process.

FIG. 10 is a flow diagram illustrating an embodiment of a transfer learning database execution process. In some embodiments, the process of FIG. 10 is executed using 204 of FIG. 2. In the example shown, in 1000, function input is provided. In some embodiments, an error is thrown in the event a function corresponding to the provided input or function call does not exist in function storage. In the event a label is not provided, the model utilized by the function may be an original model (e.g. not created via transfer learning or a model add-on). At 1002, execution of the function is caused. At 1004, function outputs are received.

Figure 11:
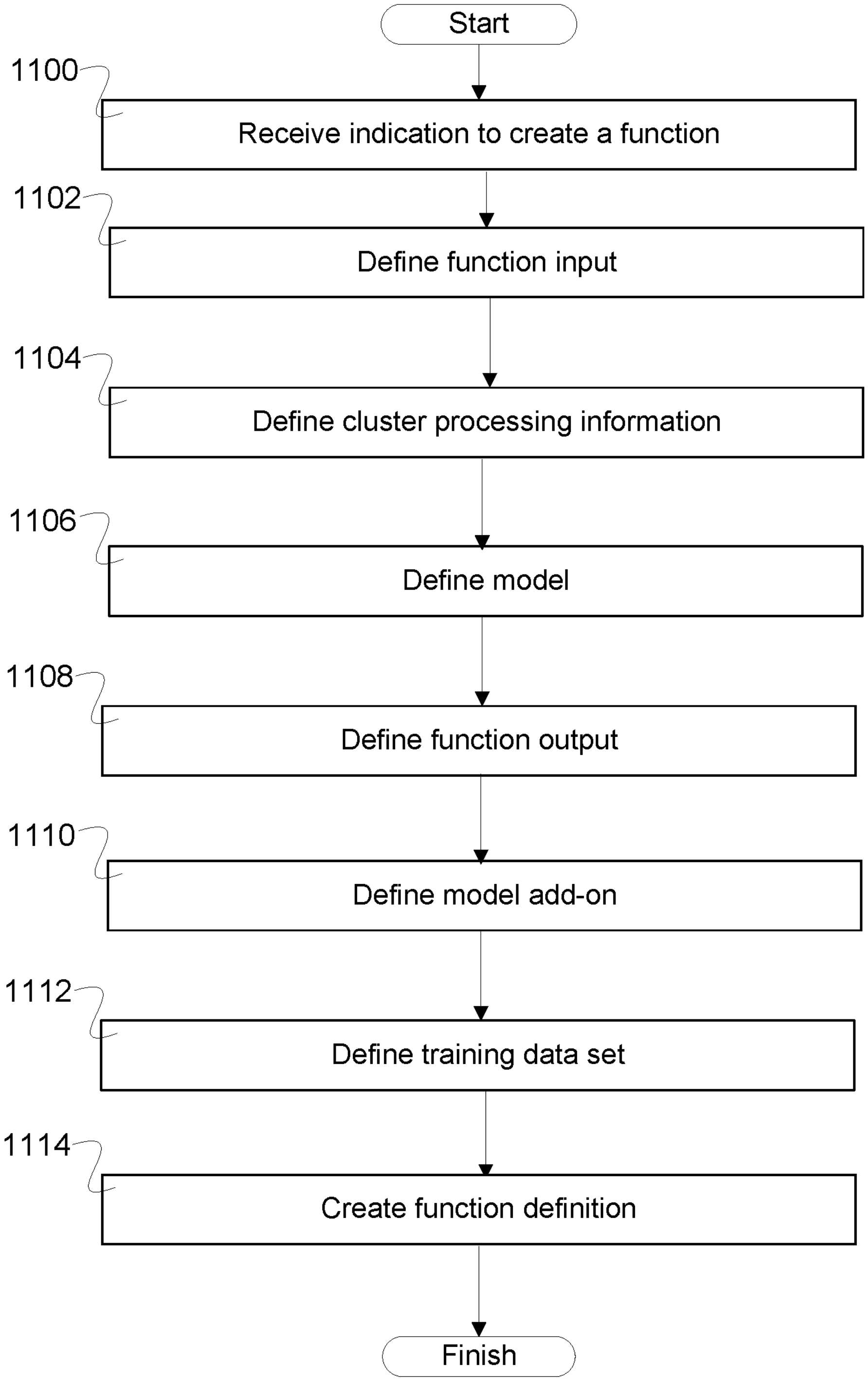
FIG. 11 is a flow diagram illustrating an embodiment of a transfer learning database function creator user process.

FIG. 11 is a flow diagram illustrating an embodiment of a transfer learning database function creation process. In some embodiments, the process of FIG. 11 is used to implement 1002 of FIG. 10. In the example shown, a function creation method is disclosed, comprising defining one or more database function inputs, defining cluster processing information, defining a deep learning model, defining one or more database function outputs, defining a model add-on, and defining a training data set for the model add-on and the deep learning model. A database function is created based at least in part on the one or more function inputs, the cluster processing information, the deep learning model, the one or more database function outputs, the model add-on, and the training data set. In some embodiments, the process is identical to the original disclosed method with additional steps of defining a model add-on and defining a training data set.

In the example shown, in 1100, an indication is received to create a function. In 1102, a function input is defined. In 1104, cluster processing information is defined. In 1106, a model is defined. In 1108, function output is defined. In 1110, a model add-on is defined. In some embodiments, defining the model add-on comprises defining initial weights and relationships of nodes or defining a neural network. In 1112, a training data set is defined. Following the car identification example, the training data set may comprise information that specifically identifies a type of car. The training data set may be small relative to the size of a training data set used to train the original parent deep learning model. In 1114, a function definition is created. For example, the definition for the combination function is saved and/or registered.

In some embodiments, the creation of a combined function is similar to the creation of a database function for a deep learning model as in FIG. 4.

Figure 12:
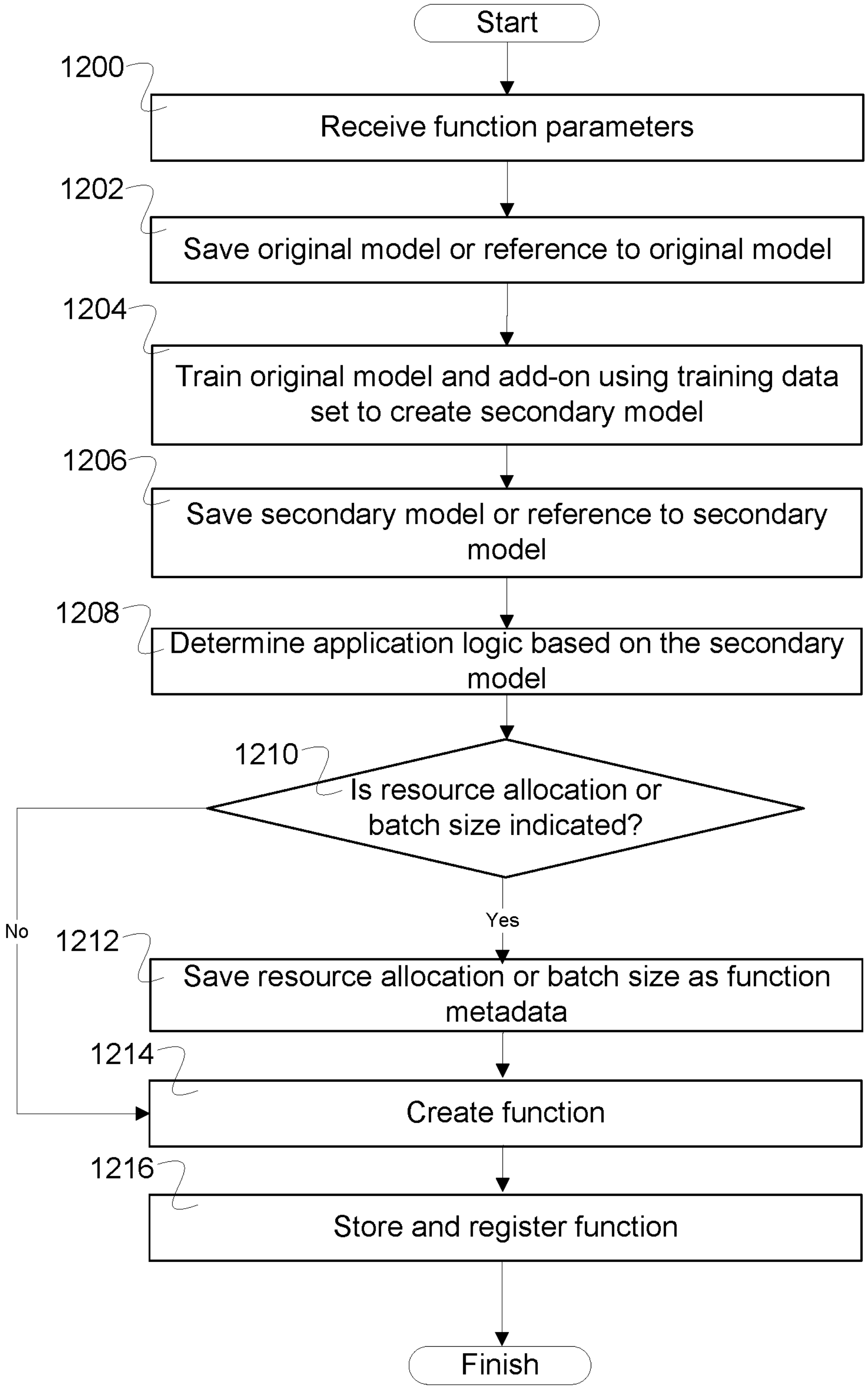
FIG. 12 is a flow diagram illustrating an embodiment of a transfer learning database function creator process.

FIG. 12 is a flow diagram illustrating an embodiment of a transfer learning database function creator process. In some embodiments, the process of FIG. 12 is used to implement 1114 of FIG. 11. In the example shown, in 1200, function parameters are received. For example, function input types, cluster processing information, a deep learning model, function output types, a model add-on, and a training data set are received.

For the purposes of this process, "original model" refers to the deep learning model received as a function parameter. In 1202, the original model or a reference to the original model is saved. For example, the original model is serialized as part of the function or a reference to the original model is saved. In some embodiments, the original model is previously saved so this step is omitted. In 1204, the original model and add-on are trained using the training data set to create a secondary model. The original model and add-on may be connected by connecting an output node of the original model to an input node of the add-on. In 1206, the secondary model or a reference to the secondary model is saved. In 1208, application logic is determined based on the secondary model. In some embodiments, the model framework of the model add-on and original model are required to be the same, causing the secondary model to share the same model framework. In some embodiments, a model add-on or original model may be converted to a different model format in order to match model framework types. The application logic is determined based on the model framework of the secondary model. In 1210, it is determined whether resource allocation or batch size is indicated. In the event resource allocation or batch size is not indicated, in 1214 a function is created. In the event resource allocation or batch size is indicated, the resource allocation or batch size is saved as function metadata in 1212 before function creation. Following function creation, in 1216 the function is stored and registered. In some embodiments, the function is stored and/or registered as a definition or as an object whichever is more useful to be able to execute the function to run on a cluster after being called by a user within the database user interface.

In some embodiments, the function is saved as an existing function with a new label. For example, in the event a function based on the original model exists titled "classify_fruit," the function may be saved as "classify_fruit" with label "strawberry" in the event the combination deep learning model was trained on classifying strawberries.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:

creating a definition of a database function that packages and implements a machine learning model, wherein the database function comprises a structured query language (SQL) user-defined function that is callable from a database interface, wherein the machine learning model is configured to generate an output based on an input passed to the database function, and wherein creating the definition of the database function comprises:

specifying, for the machine learning model, a model file location and a model framework, the model framework comprising a model file format and an execution engine type;

determining one or more input nodes and one or more output nodes of the machine learning model from a set of model files stored at the model file location, and connecting the one or more input nodes and the one or more output nodes to one or more database function inputs and one or more database function outputs, respectively; and defining preprocessing that transforms the one or more database function inputs from a database query language format into a model input format of the machine learning model, and postprocessing that transforms one or more outputs of the machine learning model into a database function output format of the one or more database function outputs;

selecting a first cluster configuration for the database function implementing the machine learning model, the first cluster configuration including a first set of computing resources;

implementing the database function in the first cluster configuration;

generating a first set of performance data by providing test data as input to the database function in the first cluster configuration;

selecting a second cluster configuration for the database function implementing the machine learning model, the second cluster configuration including a second set of computing resources that is different than the first set of computing resources;

generating a second set of performance data by providing the test data as input to the database function in the second cluster configuration;

determining an optimized cluster configuration for implementing the database function based on an analysis of the first set of performance data and the second set of performance data; and executing the database function based on the definition in the optimized cluster configuration.

2. The method of claim 1, further comprising:

selecting a third cluster configuration for the database function implementing the machine learning model, the third cluster configuration including a third set of computing resources that is different than the first set of computing resources and the second set of computing resources; and generating a third set of performance data by providing the test data as input to the database function in the third cluster configuration, wherein determining the optimized cluster configuration for implementing the database function is further based on an analysis of the third set of performance data.

3. The method of claim 2, wherein a number of GPUs in the first set of computing resources is different than a number of GPUs in the second set of computing resources.

4. The method of claim 2, wherein a number of CPUs in the first set of computing resources is different than a number of CPUs in the second set of computing resources.

5. The method of claim 1, wherein the first set of computing resources and the second set of computing resources each include at least one Graphical Processing Unit (GPU) and at least one Central Processing Unit (CPU).

6. The method of claim 1, wherein determining the optimized cluster configuration for implementing the database function based on the analysis of the first set of performance data and the second set of performance data comprises:

determining, based on the first set of performance data, a calculation speed for the machine learning model to process the test data while implemented in the first cluster configuration;

determining, based on the second set of performance data, a calculation speed for the machine learning model to process the test data while implemented in the second cluster configuration; and comparing the calculation speed for the machine learning model to process the test data while implemented in the first cluster configuration to the calculation speed for the machine learning model to process the test data while implemented in the second cluster configuration.

7. The method of claim 1, wherein determining the optimized cluster configuration for implementing the database function based on the analysis of the first set of performance data and the second set of performance data comprises:

determining, based on the first set of performance data, a resource usage for the machine learning model to process the test data while implemented in the first cluster configuration;

determining, based on the second set of performance data, a resource usage for the machine learning model to process the test data while implemented in the second cluster configuration; and comparing the resource usage for the machine learning model to process the test data while implemented in the first cluster configuration to the resource usage for the machine learning model to process the test data while implemented in the second cluster configuration.

8. A computing system comprising:

one or more computer processors; and one or more computer-readable mediums comprising stored instructions that, when executed by the one or more computer processors, cause the computing system to perform operations comprising:

creating a definition of a database function that packages and implements a machine learning model, wherein the database function comprises a structured query language (SQL) user-defined function that is callable from a database interface, wherein the machine learning model is configured to generate an output based on an input passed to the database function, and wherein creating the definition of the database function comprises:

specifying, for the machine learning model, a model file location and a model framework, the model framework comprising a model file format and an execution engine type;

determining one or more input nodes and one or more output nodes of the machine learning model from a set of model files stored at the model file location, and connecting the one or more input nodes and the one or more output nodes to one or more database function inputs and one or more database function outputs, respectively; and defining preprocessing that transforms the one or more database function inputs from a database query language format into a model input format of the machine learning model, and postprocessing that transforms one or more outputs of the machine learning model into a database function output format of the one or more database function outputs;

selecting a first cluster configuration for the database function implementing the machine learning model, the first cluster configuration including a first set of computing resources;

implementing the database function in the first cluster configuration;

generating a first set of performance data by providing test data as input to the database function in the first cluster configuration;

selecting a second cluster configuration for the database function implementing the machine learning model, the second cluster configuration including a second set of computing resources that is different than the first set of computing resources;

generating a second set of performance data by providing the test data as input to the database function in the second cluster configuration;

determining an optimized cluster configuration for implementing the database function based on an analysis of the first set of performance data and the second set of performance data; and executing the database function based on the definition in the optimized cluster configuration.

9. The computing system of claim 8, further comprising stored instructions that, when executed by the one or more computer processors, cause the computing system to perform operations further comprising:

selecting a third cluster configuration for the database function implementing the machine learning model, the third cluster configuration including a third set of computing resources that is different than the first set of computing resources and the second set of computing resources; and generating a third set of performance data by providing the test data as input to the database function in the third cluster configuration, wherein determining the optimized cluster configuration for implementing the database function is further based on an analysis of the third set of performance data.

10. The computing system of claim 8, wherein the first set of computing resources and the second set of computing resources each include at least one Graphical Processing Unit (GPU) and at least one Central Processing Unit (CPU).

11. The computing system of claim 10, wherein a number of GPUs in the first set of computing resources is different than a number of GPUs in the second set of computing resources.

12. The computing system of claim 10, wherein a number of CPUs in the first set of computing resources is different than a number of CPUs in the second set of computing resources.

13. The computing system of claim 8, wherein the instructions that, when executed by the one or more computer processors, cause the computing system to perform determining the optimized cluster configuration for implementing the database function based on the analysis of the first set of performance data and the second set of performance data, further comprises instructions that, when executed by the one or more computer processors, cause the computing system to perform operations comprising:

determining, based on the first set of performance data, a calculation speed for the machine learning model to process the test data while implemented in the first cluster configuration;

determining, based on the second set of performance data, a calculation speed for the machine learning model to process the test data while implemented in the second cluster configuration; and comparing the calculation speed for the machine learning model to process the test data while implemented in the first cluster configuration to the calculation speed for the machine learning model to process the test data while implemented in the second cluster configuration.

14. The computing system of claim 8, wherein the instructions that, when executed by the one or more computer processors, cause the computing system to perform determining the optimized cluster configuration for implementing the database function based on the analysis of the first set of performance data and the second set of performance data, further comprises instructions that, when executed by the one or more computer processors, cause the computing system to perform operations comprising:

determining, based on the first set of performance data, a resource usage for the machine learning model to process the test data while implemented in the first cluster configuration;

determining, based on the second set of performance data, a resource usage for the machine learning model to process the test data while implemented in the second cluster configuration; and comparing the resource usage for the machine learning model to process the test data while implemented in the first cluster configuration to the resource usage for the machine learning model to process the test data while implemented in the second cluster configuration.

15. A non-transitory computer-readable medium comprising stored instructions that, when executed by one or more computer processors of a computing system, cause the computing system to perform operations comprising:

creating a definition of a database function that packages and implements a machine learning model, wherein the database function comprises a structured query language (SQL) user-defined function that is callable from a database interface, wherein the machine learning model is configured to generate an output based on an input passed to the database function, and wherein creating the definition of the database function comprises:

specifying, for the machine learning model, a model file location and a model framework, the model framework comprising a model file format and an execution engine type;

determining one or more input nodes and one or more output nodes of the machine learning model from a set of model files stored at the model file location, and connecting the one or more input nodes and the one or more output nodes to one or more database function inputs and one or more database function outputs, respectively; and defining preprocessing that transforms the one or more database function inputs from a database query language format into a model input format of the machine learning model, and postprocessing that transforms one or more outputs of the machine learning model into a database function output format of the one or more database function outputs;

selecting a first cluster configuration for the database function implementing the machine learning model, the first cluster configuration including a first set of computing resources;

implementing the database function in the first cluster configuration;

generating a first set of performance data by providing test data as input to the database function in the first cluster configuration;

selecting a second cluster configuration for the database function implementing the machine learning model, the second cluster configuration including a second set of computing resources that is different than the first set of computing resources;

generating a second set of performance data by providing the test data as input to the database function in the second cluster configuration;

determining an optimized cluster configuration for implementing the database function based on an analysis of the first set of performance data and the second set of performance data; and executing the database function based on the definition in the optimized cluster configuration.

16. The non-transitory computer-readable medium of claim 15, wherein the operations further comprise:

selecting a third cluster configuration for the database function implementing the machine learning model, the third cluster configuration including a third set of computing resources that is different than the first set of computing resources and the second set of computing resources; and generating a third set of performance data by providing the test data as input to the database function in the third cluster configuration, wherein determining the optimized cluster configuration for implementing the database function is further based on an analysis of the third set of performance data.

17. The non-transitory computer-readable medium of claim 15, wherein the first set of computing resources and the second set of computing resources each include at least one Graphical Processing Unit (GPU) and at least one Central Processing Unit (CPU), and a number of GPUs in the first set of computing resources is different than a number of GPUs in the second set of computing resources.

18. The non-transitory computer-readable medium of claim 15, wherein the first set of computing resources and the second set of computing resources each include at least one Graphical Processing Unit (GPU) and at least one Central Processing Unit (CPU), and a number of CPUs in the first set of computing resources is different than a number of CPUs in the second set of computing resources.

19. The non-transitory computer-readable medium of claim 15, wherein instructions that, when executed by the one or more computer processors, cause the computing system to perform determining the optimized cluster configuration for implementing the database function based on the analysis of the first set of performance data and the second set of performance data, further comprises instructions that, when executed by the one or more computer processors, cause the computing system to perform operations comprising:

determining, based on the first set of performance data, a calculation speed for the machine learning model to process the test data while implemented in the first cluster configuration;

determining, based on the second set of performance data, a calculation speed for the machine learning model to process the test data while implemented in the second cluster configuration; and comparing the calculation speed for the machine learning model to process the test data while implemented in the first cluster configuration to the calculation speed for the machine learning model to process the test data while implemented in the second cluster configuration.

20. The non-transitory computer-readable medium of claim 15, wherein the instructions that, when executed by the one or more computer processors, cause the computing system to perform determining the optimized cluster configuration for implementing the database function based on the analysis of the first set of performance data and the second set of performance data, further comprises instructions that, when executed by the one or more computer processors, cause the computing system to perform operations comprises:

determining, based on the first set of performance data, a resource usage for the machine learning model to process the test data while implemented in the first cluster configuration;

determining, based on the second set of performance data, a resource usage for the machine learning model to process the test data while implemented in the second cluster configuration; and comparing the resource usage for the machine learning model to process the test data while implemented in the first cluster configuration to the resource usage for the machine learning model to process the test data while implemented in the second cluster configuration.

* * * * *